United States Patent [19]

Johnstone et al.

[11] 4,109,309
[45] Aug. 22, 1978

[54] METHOD AND APPARATUS FOR REMOTE DISPLAY OF ANALOG SIGNALS OCCURRING IN COMPUTER CONTROLLED MACHINE TOOLS

[75] Inventors: Richard Johnstone; Lyle D. Ostby, both of Brookfield, Wis.

[73] Assignee: Kearney & Trecker Corporation, West Allis, Wis.

[21] Appl. No.: 767,142

[22] Filed: Feb. 9, 1977

[51] Int. Cl.² ............................ G06F 3/05; G06F 15/46
[52] U.S. Cl. .................................... 364/120; 340/151;
340/347 AD; 364/468; 364/514; 364/900
[58] Field of Search ............... 340/180, 151, 347 AD;
128/2.1 A; 179/2 DP, 2 A; 364/200 MS File,
900 MS File

[56] References Cited

U.S. PATENT DOCUMENTS

| | | | |
|---|---|---|---|
| 3,376,465 | 4/1968 | Corpew | 340/324 AD |
| 3,689,879 | 9/1972 | Burdick | 179/2 DP |
| 3,882,305 | 5/1975 | Johnstone | 235/151.11 |
| 3,910,257 | 10/1975 | Fletcher | 128/2.1 A |
| 3,990,036 | 11/1976 | Savit | 340/151 |
| 4,048,635 | 9/1977 | Bich | 340/347 DA |

*Primary Examiner*—Jerry Smith
*Attorney, Agent, or Firm*—Cyril M. Hajewski

[57] ABSTRACT

An analog signal which occurs in a computer controlled machine tool is converted to digital form at the machine tool site and is stored in a memory portion of the machine tool computer. The digitized analog signal is subsequently read out of the memory and is transmitted to a remote diagnostic unit via a conventional digital transmission link. The digitized analog signal received by the diagnostic unit is stored in a memory portion of the diagnostic computer and is subsequently read out and converted back to analog form for display on an oscilloscope in the diagnostic unit to aid in the diagnosis of existing or incipient faults in the machine tool.

17 Claims, 6 Drawing Figures

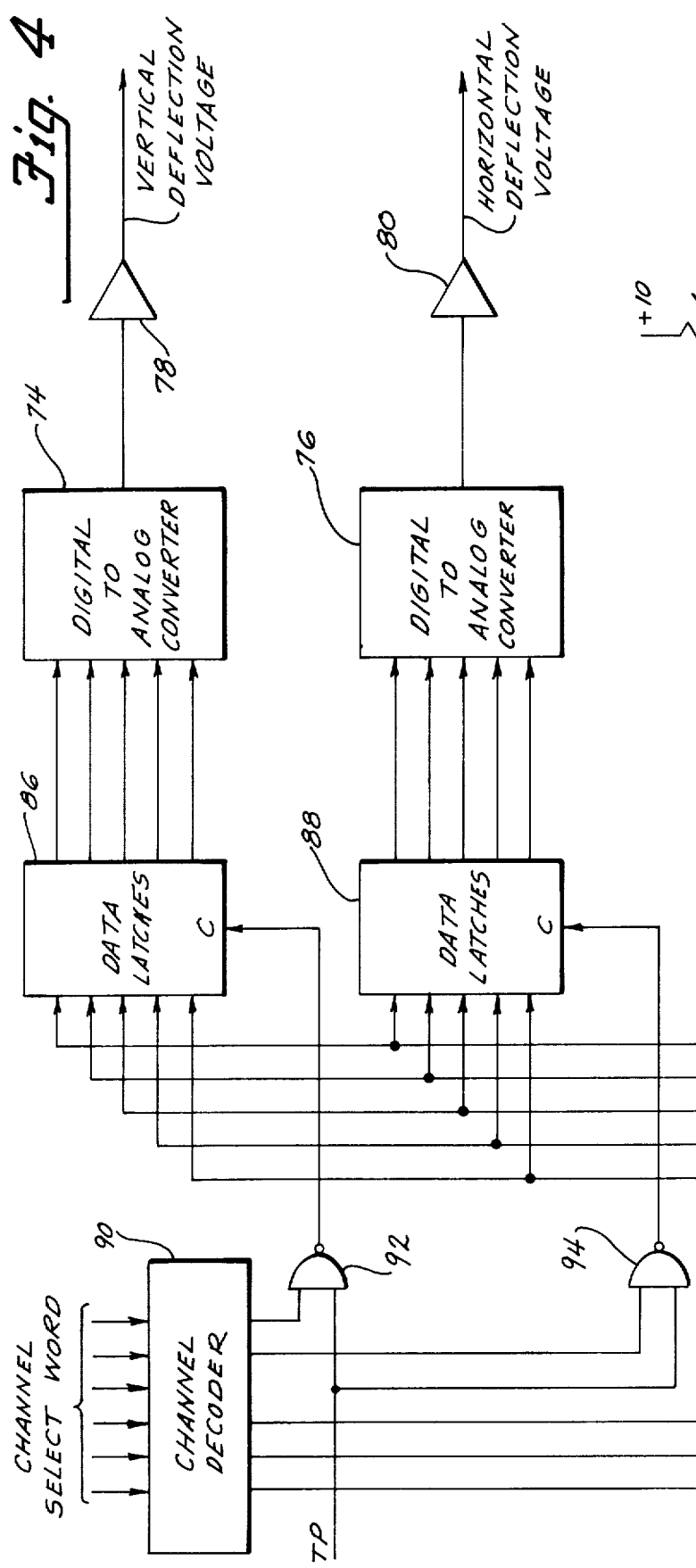
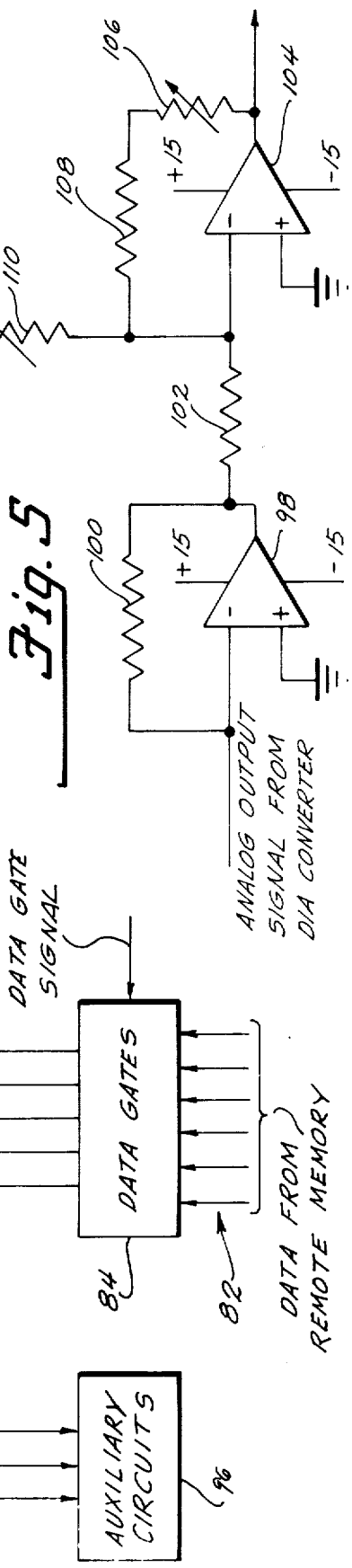
Fig. 4
Fig. 5

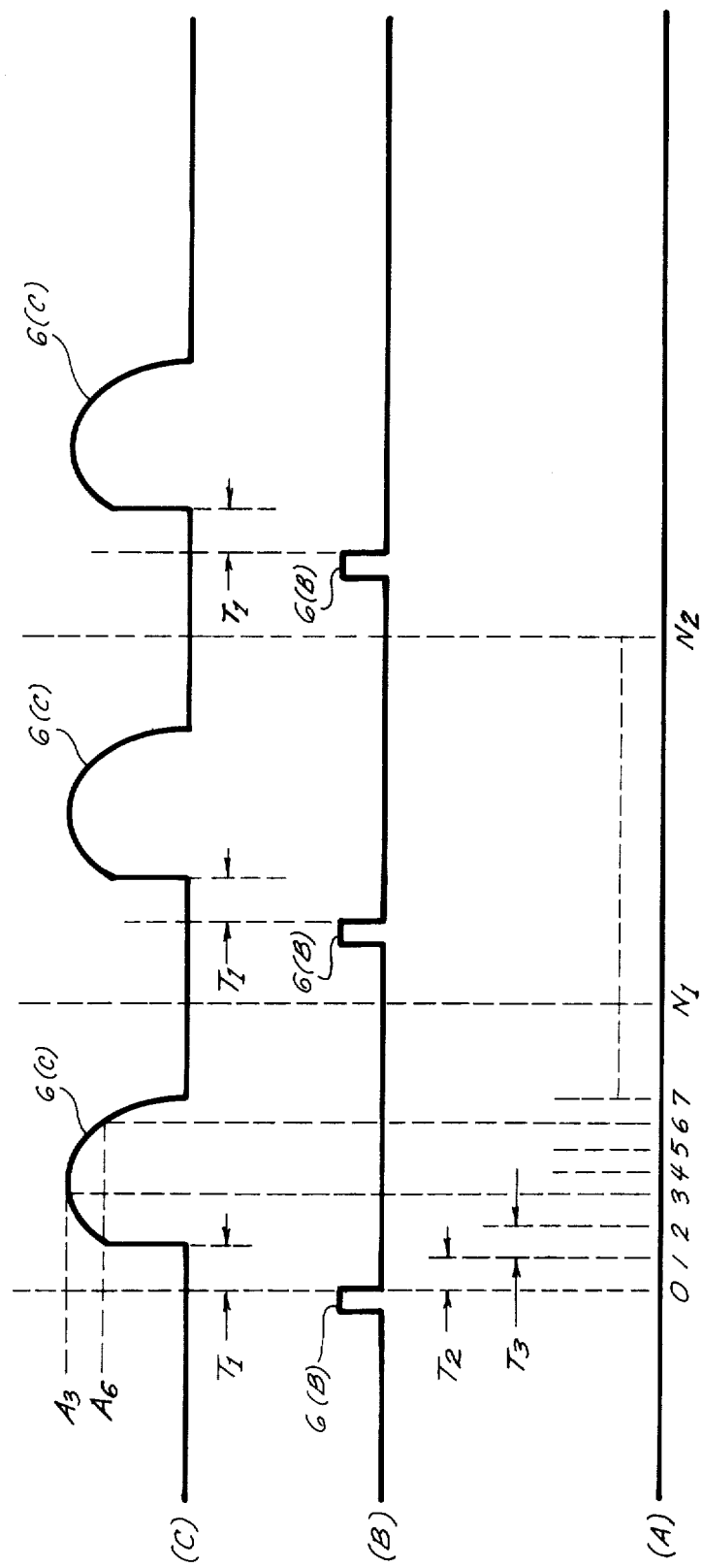

though't
METHOD AND APPARATUS FOR REMOTE DISPLAY OF ANALOG SIGNALS OCCURRING IN COMPUTER CONTROLLED MACHINE TOOLS

BACKGROUND OF THE INVENTION

This invention relates to diagnostic circuits for computer controlled machine tools or the like. In the past, a diagnostic communication system has been designed which interlinks any one of a number of geographically separated, computer controlled machine tools with diagnostic and analysis equipment in a central diagnostic unit which is remote from the machine tools. This diagnostic communication system is described in U.S. Pat. No. 3,882,305, which was issued on May 6, 1975, for a "Diagnostic Communication System for Computer Controlled Machine Tools". In this system, the computer associated with any selected machine tool is connected with the diagnostic apparatus over a telephone line, and the machine tool is caused to execute a predetermined diagnostic routine in response to instructions transmitted to the machine tool computer from the diagnostic apparatus. The operating characteristics of the machine tool are monitored during the operation thereof and are communicated to the diagnostic apparatus, where they are compared with corresponding characteristics previously collected for the same machine tool, and with design limit parameters. Such comparisons enable an analyst at the remote diagnostic site to diagnose actual or incipient faults in the machine tool.

The above-described diagnostic communication system has one major shortcoming in that it is limited to monitoring machine tool characteristics which are expressed as digital signals and has no provision for monitoring analog signals, although there are analog signals in the machine tool which in some cases are more revealing in regard to faults than are the digital signals. Accordingly, the principal object of this invention is to provide a method and apparatus for transmitting analog signals from a computer controlled machine tool to an analog display device in a remote location and for displaying the analog signals to aid in the diagnosis of existing or incipient faults in the machine tool.

Other objects and advantages of the invention will be apparent from the description which follows.

SUMMARY OF THE INVENTION

In the method of this invention, the selected analog signal is digitized in an analog to digital converter at the machine tool site and the digital signals are stored in a memory portion of the machine tool computer. The digitized analog signal is subsequently transmitted to an analog display device at a remote location over a conventional digital transmission link and is stored in a memory associated with the analog display device. The digitized analog signal is subsequently read out of the memory and is converted back to analog form in a digital to analog converter at the remote location and is displayed on the analog display device. The apparatus of this invention includes the analog to digital converter, local memory, digital transmission means, remote memory, digital to analog converter, analog display device, and the control means for all of the foregoing units.

BRIEF DESCRIPTION OF THE DRAWINGS

FIG. 4 is a detailed block diagram of the digital to analog converter and controller 22 shown in FIG. 1;

FIG. 5 is a schematic circuit diagram of the output circuit for one of the digital to analog converters 74 and 76 shown in FIG. 4; and FIG. 6 is a set of waveforms illustrating the operation of the embodiment shown in FIGS. 1 to 5.

DESCRIPTION OF THE PREFERRED EMBODIMENT

Figure 1:
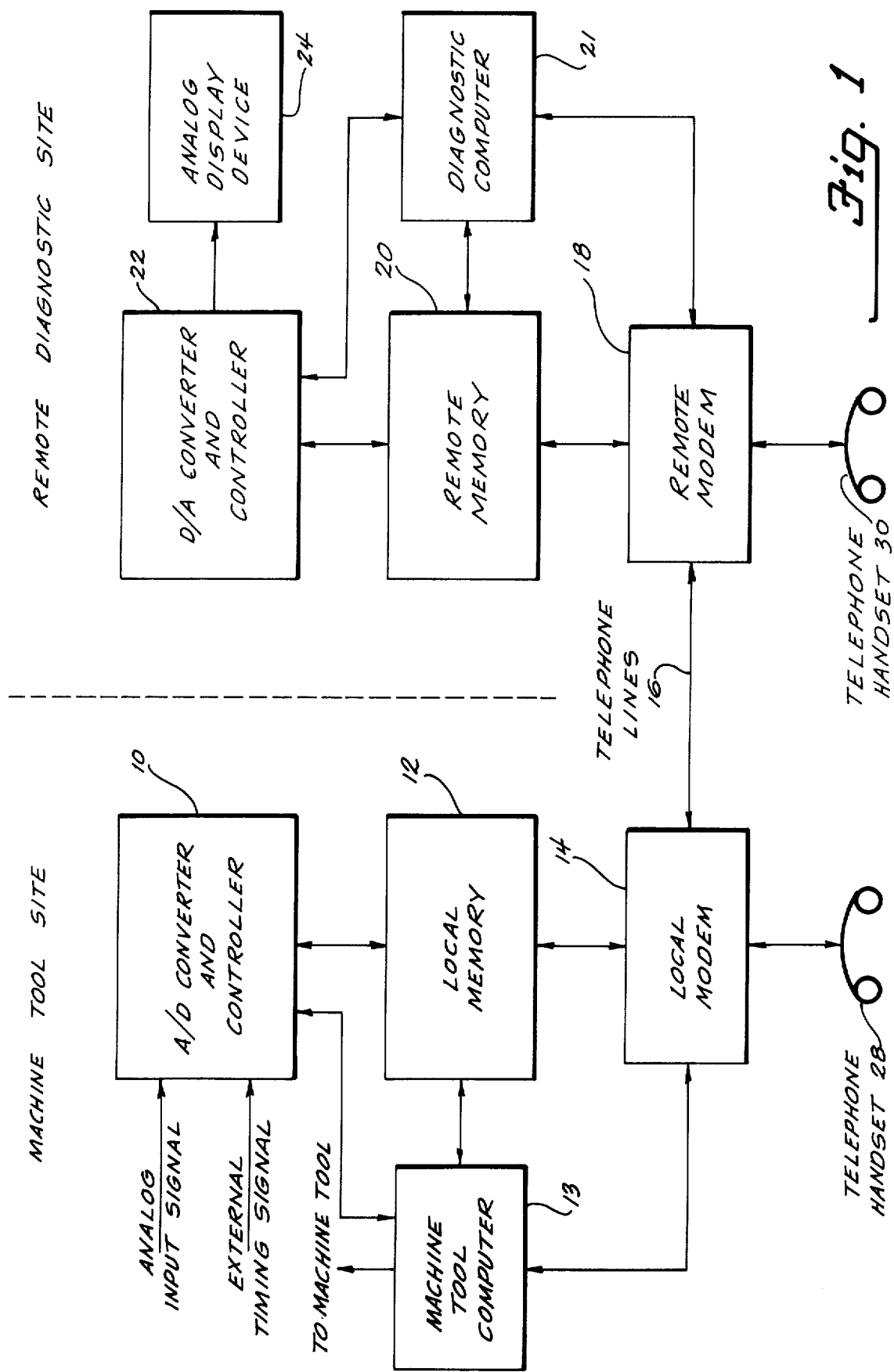
FIG. 1 is a general block diagram of the preferred embodiment of the invention.

Referring to FIG. 1, the preferred apparatus of the invention includes an analog to digital converter and controller 10, a local memory 12, which is preferably a part of a machine tool computer 13 but which may be separate therefrom, a digital transmission system including a local modem 14, telephone lines 16, and a remote modem 18, which is preferably a part of a diagnostic communication system such as disclosed in the above-noted U.S. Pat. No. 3,882,305 but which may be separate therefrom, a remote memory 20, which is preferably but not necessarily a part of a diagnostic computer 21, a digital to analog converter and controller 22, and an analog display device 24.

In the method of this invention, the desired analog signal, and possibly a timing signal therefor, is picked up in the machine tool circuitry by a manual probe 26 (FIG. 2) which is coupled to the input of analog to digital converter and controller 10. This analog signal is converted in A/D converter and controller 10 to a sequence of digital signals each of which represent the amplitude of the analog signal at a corresponding time. This sequence of digital signals is applied to local memory 12 where it is stored. At some subsequent time, the sequence of digital signals is read out of memory 12 and is transmitted via local modem 14, telephone lines 16, and remote modem 18 to remote memory 20. It will be understood that a radio transmission link could be used in place of the telephone transmission link if desired. The sequence of digital signals stored in remote memory 20 is subsequently read out and is applied to digital to analog converter and controller 22 where it is converted back to analog form as an approximation of the original analog signal. The output of D/A converter and controller 22 is applied to analog display device 24 for display thereon.

Telephone handsets 28 and 30 are preferably provided at the machine tool and diagnostic sites, respectively, for voice communication between the analyst at the diagnostic site and the machine tool operator. The analyst usually verbally specifies the desired analog signal and timing signal to the machine tool operator who then connects test probe 26 to the appropriate test points in the machine tool circuitry. When the probe is connected, the signal conversion, transmission, reconversion, and display are initiated by the analyst at the remote diagnostic site.

Figure 2:
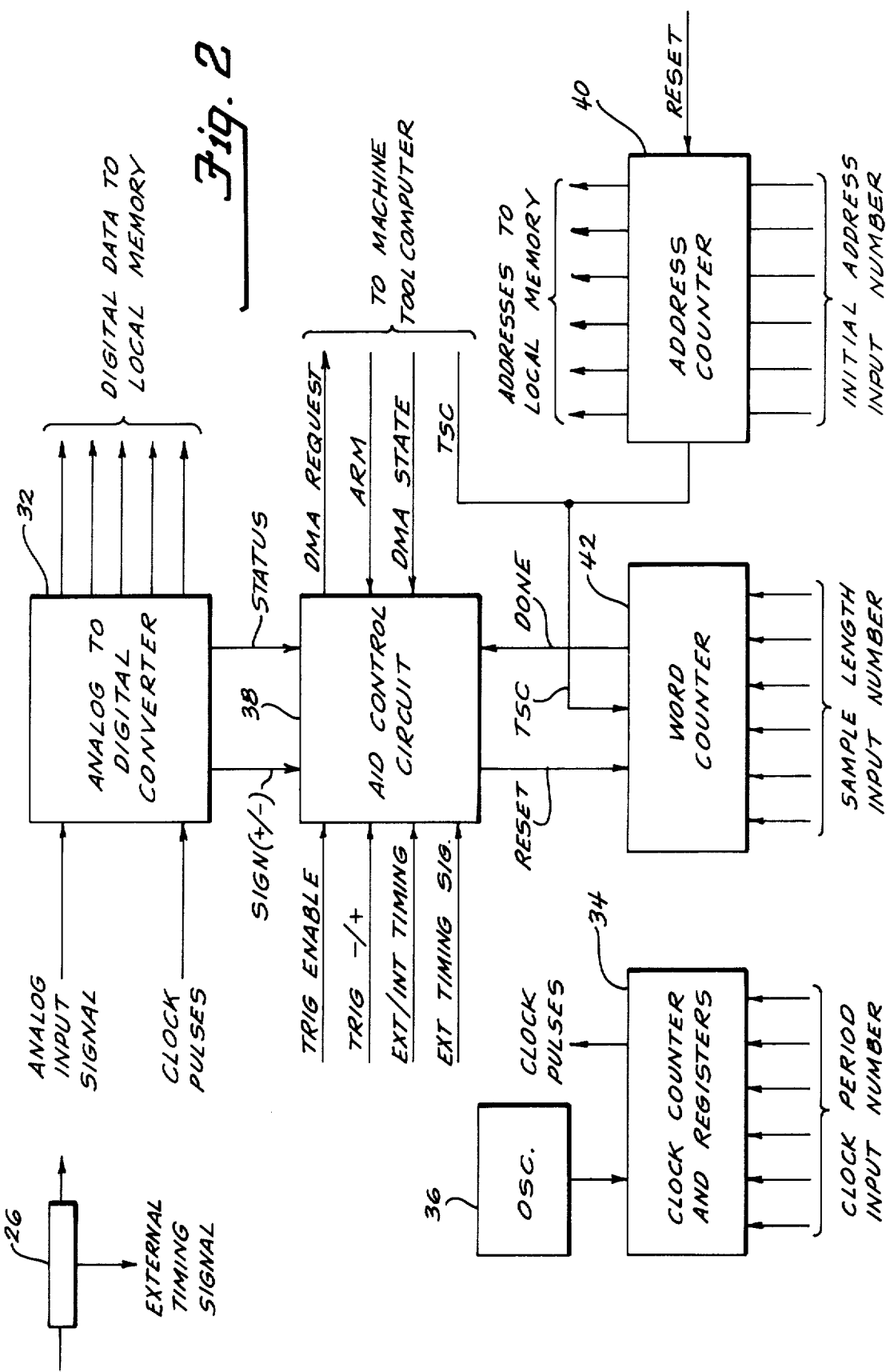
FIG. 2 is a detailed block diagram of the analog to digital converter and controller 10 shown in FIG. 1.
Figure 3:
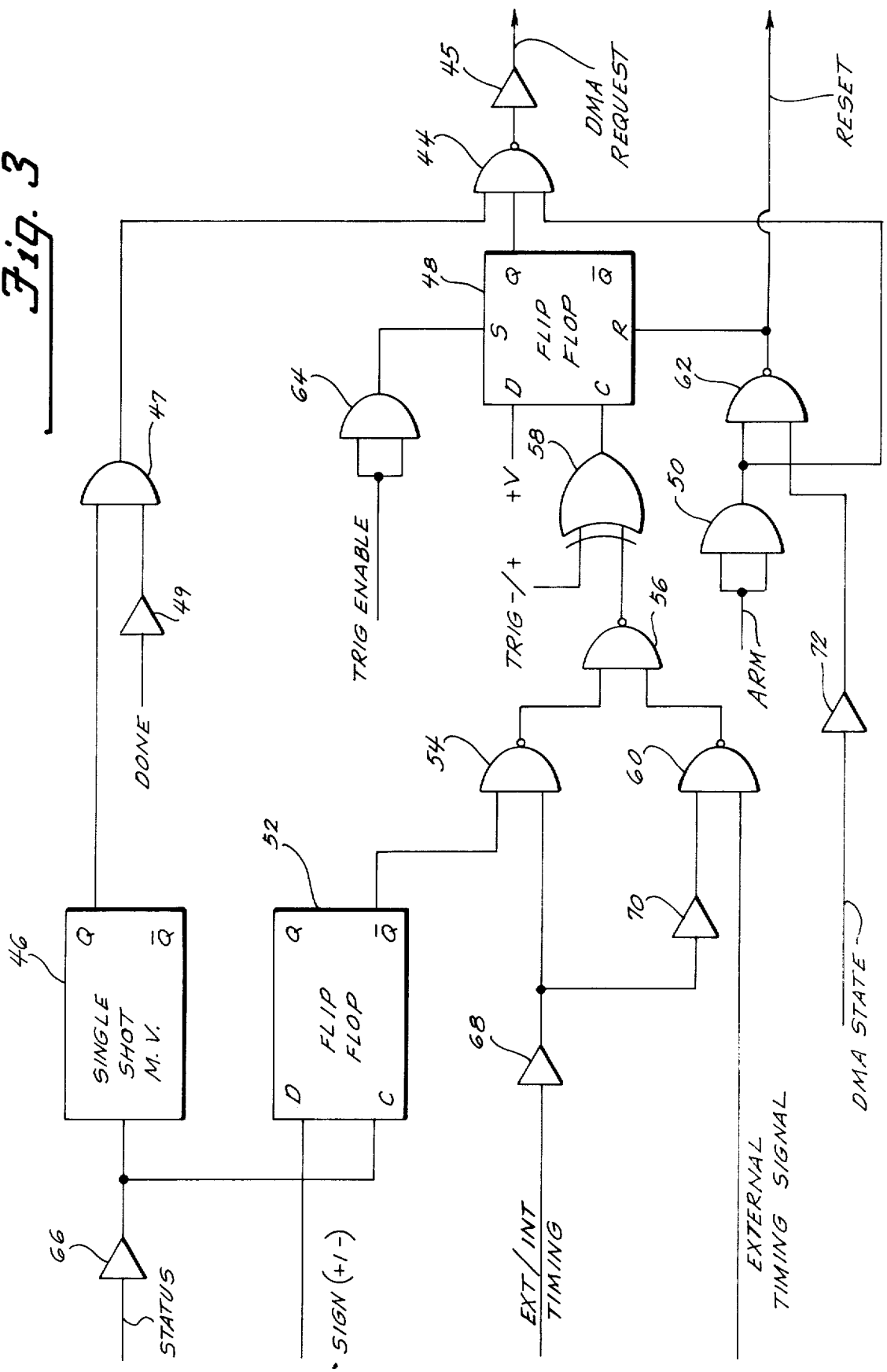
FIG. 3 is a detailed block diagram of the analog to digital control circuit 38 shown in FIG. 2.

FIGS. 2 and 3 show a detailed block diagram of analog to digital converter and controller 10. Referring to FIG. 2, the analog input signal from manual probe 26 is applied to a conventional analog to digital converter 32 which also receives clock pulse inputs from a clock counter and register circuit 34 which is driven by an oscillator 36. Clock counter and register 34 receives a digital input number which preloads the counter to determine the clock period to be used for the analog to digital conversion. The clock period input number, which is preloaded into clock counter 34, determines the number of oscillator input pulses required to make the clock counter overflow. Any desired number of input pulses from 1 to the capacity of counter 34 can be selected as the clock timing period. The clock counter overflow signal forms the clock pulses for the system. The clock period input number is stored in a conventional register and is reloaded into the clock counter every time it overflows so that each clock period is equal to the selected clock period.

Analog to digital converter 32 performs an A/D conversion cycle every time it receives a clock pulse. During the A/D conversion cycle, A/D converter 32 produces a positive STATUS output signal which goes to zero when the conversion cycle is completed. The STATUS signal and SIGN (+/−) signal of the analog quantity digitized in the preceding conversion cycle are applied to an A/D control circuit 38 which is disclosed in detail in FIG. 3 and which is described hereinafter.

When the appropriate timing signal is received or generated, A/D control circuit 38 generates a DMA (Direct Memory Access) REQUEST signal which is applied to machine tool computer 13 and causes the digital output of A/D converter 32 to be entered in local memory 12 at the address specified by an address counter 40. Address counter 40 is preset by a digital input number which specifies the initial address for the first digital word of the A/D conversion process. Thereafter, address counter 40 is incremented by a TSC signal from local computer 13 which goes high at the end of each entry of digital data into local memory 12 so that successive outputs of A/D converter 32 are stored in sequence in local memory 12. The TSC signal also decrements a word counter 42 which is preloaded with a digital input number which specifies the total number of words that are to be stored in the sequence of digital signals which appear at the output of A/D counter 32.

When the selected number of digital words have been stored in local memory 12, word counter 42 returns to zero and produces a DONE signal which is applied to A/D control circuit 38 and terminates the entry of data into local memory 12. (It should be noted that A/D converter 32 continues to operate after the DONE signal is generated, but its digital output signals are not entered in local memory 12).

At the start of the above-described A/D conversion process, the digital data specifying the desired clock period, the desired A/D sample length, and the initial address of the A/D sample are applied to counters 34, 42 and 40, respectively, from machine tool computer 13 or from manual input devices (not shown) or from diagnostic computer 21. An EXT/INT TIMING signal, which selects either internal or external timing, and a TRIG +/− signal, which selects a positive going or negative going trigger, are applied to A/D control circuit 38 from the same source. An ARM signal, which initiates the A/D conversion process, and DMA STATE signal, which is high during the A/D conversion process and goes low when DONE goes high, are also applied from machine tool computer 13 to A/D control circuit 38. The ARM and DMA STATE signals could also be generated by diagnostic computer 21 or by other suitable control circuits in other embodiments of the invention. A TRIG ENABLE input is also provided to A/D control circuit 38 for use when no external or internal trigger is provided as described hereinafter.

FIG. 3 shows the individual circuit elements in A/D control circuit 38. The output of this circuit is the DMA REQUEST signal which is the inverted output of a NAND gate 44 which receives inputs from a single shot multivibrator 46, a flip-flop 48, and a non-inverting amplifier 50. The output of gate 44 goes low when all of the inputs to NAND gate 44 go high, and this causes DMA REQUEST to go high. The operation of this circuit will be explained starting with the receipt of an ARM signal at the input to non-inverting amplifier 50. The ARM signal is low between A/D conversion cycles and goes high to initiate a conversion cycle. When the ARM signal goes high, it resets flip-flop 48 through NAND gate 62 if the DMA STATE signal is low, which it is between conversion cycles. This disables gate 44 until flip-flop 48 is set by the circuit described below.

At the end of an A/D conversion cycle in A/D converter 32, the STATUS signal goes from high to low, which triggers single shot multivibrator 46 and flip-flop 52 through inverting amplifier 66. The output of single shot multivibrator 46 is applied to one input of AND gate 47 which also receives a $\overline{\text{DONE}}$ signal input from inverting amplifier 49. AND gate 47 is enabled during the conversion process but is disabled to terminate the entry of data into the memory when the DONE signal goes high, which occurs when word counter 42 reaches zero at the end of the conversion process.

Under the proper conditions, described below, the triggering of flip-flop 52 may clock flip-flop 48 through gates 54, 56, and 58 and thus enable gate 44 and generate the DMA REQUEST signal. In the case where flip-flop 52 clocks flip-flop 48, the polarity of the signal causing the clocking is determined jointly by the SIGN (+/−) input to flip-flop 52, which changes with the sign of the analog input to A/D converter 32, and the TRIG −/+ selection signal input to exclusive OR gate 58, which acts as a switchable inverter. The foregoing triggering sequence is followed when the EXT/INT TIMING signal is low which selects internal timing triggered by flip-flop 52.

When external timing is selected, the EXT/INT TIMING signal is high and flip-flop 48 is clocked by an external timing signal applied to one input of NAND gate 60, whose output is applied to one input of NAND gate 56. The polarity of this trigger is also controlled by the TRIG −/+ signal through exclusive OR gate 58. Thus either internal triggering controlled by NAND gate 54 or external triggering controlled by NAND gate 60 can be selected, with the polarity of either trigger being selected by the TRIG −/+ signal. In cases where neither external nor internal triggering is available or desired, flip-flop 48 can be triggered directly by a TRIG ENABLE signal applied to the set input of flip-flop 48 through a non-inverting amplifier 64.

In the above-described manner, the DMA REQUEST signal is switched to its high state by NAND gate 44 after each analog to digital conversion cycle of A/D converter 32 after the ARM signal goes high until the DONE signal from word counter 42 goes high and disables AND gate 47. This disables NAND gate 44 and terminates the entry of the output of D/A converter 32 into local memory 12. The DONE signal goes high when word counter 42, which was preset to the desired total number of digital numbers in the A/D sample, returns to zero signifying that the desired number of digital numbers have been entered in local memory 12.

An example of the above-described A/D conversion cycle is illustrated in the wave forms of FIG. 6. Waveform 6(C) is a single wave rectified voltage which is switched on at a variable phase angle by a silicon controlled rectifier (not shown) in the machine tool control circuit and is used as an example of the type of analog signals which are generated within the machine tool control circuits and which can be displayed remotely with the method and means of this invention. Waveform 6(B) is a timing pulse in the machine tool control circuit which initiates the firing of the silicon controlled rectifier whose conduction generates waveform 6(C). Each of the sliced, single wave rectified waveforms, shown in waveform 6(C), commences after a fixed time delay $T_1$ from the timing pulse 6(B) which initiates it. Time delay $T_1$ is determined by the circuit characteristics of the machine tool control circuit. In this example, the trailing, negative going edge of trigger pulses 6(B) are used as the trigger but it is also possible to use the leading, positive going edge as a trigger, and in this case, time delay $T_1$ would be measured from the leading edge of the corresponding trigger pulse 6(B).

In this example, analog signal 6(C) and external timing signal 6(B) are picked up by probe 26 in the machine tool circuitry. The EXT/INT TIMING signal is switched high to select external timing. The TRIG −/+ signal is switched high to select triggering on the negative going transition. The digital numbers which select the clock period, the A/D sample length, and the initial address are selected and applied to their respective counters 34, 42, and 40. After these preliminary steps had been taken, the analyst in the remote diagnostic site causes the ARM signal to be generated which initiates the A/D conversion process.

As shown in waveform 6(A), the first clock pulse that occurs after the trailing edge of the next timing signal 6(B) cause the digital number resulting from the corresponding A/D conversion to be stored in local memory 12 at the address specified in address counter 40. The first clock pulse after the trailing edge of timing pulse 6(B) occurs at a time delay $T_2$ which could be any value from zero to the length of one time clock period $T_3$. At each of the numbered steps on waveform 6(A), the corresponding analog signal 6(C) is digitized, i.e., a digital number corresponding to the instantaneous amplitude of the analog signal is generated by A/D converter 32. Each of the steps 1--- $N_1$ is separated by a clock pulse interval $T_3$ corresponding to the size of the clock period digital number entered into the clock counter and register circuit 34. The A/D conversion process continues up to the word number $N_1$, which is the total sample length input number entered into word counter 42 and indicates the desired length of the analog sample, i.e., the total number of digital numbers entered in local memory 12. In this particular example, the sample length $N_1$ is selected to cover a single cycle of the analog waveform 6(C), but if desired, a larger sample length $N_2$ could be selected to cover two cycles of waveform (6C). Any length sample up to the limits of counters 34 and 42 can be selected.

At the end of the selected sample length $N_1$ or $N_2$, word counter 42 returns to zero and generates the DONE signal which terminates the A/D conversion process and which may initiate transmission of the digitized analog signal stored in local memory 12 during the preceding A/D conversion process. Alternately, the digitized analog signal, which comprises a sequence of digital numbers each of which represents the amplitude of the analog signal at a corresponding time, such as illustrated in FIG. 6(C) by the amplitudes $A_3$ and $A_6$, could be transmitted over the DCS transmission link at any desired time by conventional transmission circuits and stored in remote memory 20 for subsequent display on analog display device 24.

The digital to analog converter and controller 22 is shown in detailed block diagram form in FIG. 4. In this particular example, analog display device 24 is an oscilloscope and two digital to analog converters 74 and 76 are employed, one for the vertical deflection voltage of the oscilloscope and the other for the horizontal deflection voltage. The digitized analog signal stored in remote memory 20 is applied to D/A converter 74 to generate an approximation of analog waveform 6(C) while a horizontal sweep voltage, which, in this case, is also stored as a sequence of digital signals in remote memory 20, is applied to D/A converter 76 to generate a horizontal deflection voltage. The output voltages of both D/A converters 74 and 76 are amplified by corresponding amplifiers 78 and 80.

The digital numbers for the horizontal and vertical deflection signals are interleaved in time sequence, i.e., first a horizontal number is applied to the data input bus 82, then a vertical number, then the next horizontal number, followed by the next vertical number, and so on in interleaved time sequence. Each of these numbers is gated in parallel through data gates 84 to two sets of data latches 86 and 88 which are coupled respectively to D/A converters 74 and 76 and apply the input voltages thereto. Every time one of the digital words is applied to data input bus 82, and gated to data latches 86 and 88 by a DATA GATE signal, a channel select word is applied to a channel decoder 90 which enables either NAND gate 92 or NAND gate 94 depending on whether the digital number on data input bus 82 is a vertical deflection number or a horizontal deflection number. A timing signal TP, which is applied in parallel to NAND gates 92 and 94, clocks the data into the corresponding data latches 86 or 88, while the other data latches 86 or 88 retain their previous data. In this manner, the interleaved vertical and horizontal data input numbers applied to data input bus 82 are routed to the correct D/A converter.

In some cases, auxiliary circuits 96 are employed, which may be a strip recorder, X-Y plotter, digital printout, or the like, and in these cases, separate channel select words may be provided to turn these devices on and off or to adjust their operating parameters.

The output of both D/A converters 74 and 76 are good approximations of the analog voltages from which their respective digital input signals are derived. The degree of approximation can be improved if desired by decreasing the timing period $T_3$ (FIG. 6).

FIG. 5 shows the preferred circuit for D/A output amplifiers 78 and 80. The analog output signal from the corresponding D/A converter is applied to the negative input of a conventional operational amplifier 98 whose positive input is grounded and which has a feedback resistor 100 connected between its negative input and output to provide a parallel-parallel feedback which produces a voltage at the output proportional to input current. The output of operational amplifier 98 is applied through resistor 102 to the negative input of a conventional operational amplifier 104 whose positive input is grounded. Feedback resistors 106 and 108 are connected in series between the output of operational amplifier 104 and the negative input thereof. Resistor 106 is variable and serves to adjust the gain of the amplifier. An offset voltage is applied to the negative input terminal of operational amplifier 104 through an adjustable resistor 110 which adjusts the zero point for the analog function. This circuit can be used for both vertical amplifier 78 and horizontal amplifier 80.

The above-described examples have utilized an external timing signal. In cases where no external timing signal is available, internal timing can be used in which the analog to digital conversion process is initiated when the analog signal goes from a negative to a positive value or from a positive to a negative value as determined by the TRIG −/+ selection signal. When the selected analog signal does not normally change polarity, it can be offset half way from zero by conventional offset circuit means at the input to A/D converter 32 so that there will be a shift of polarity at the start of the waveform for triggering purposes.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. Apparatus for displaying an analog signal which occurs in a computer controlled machine tool circuit on an analog display device which is located in a site remote from the machine tool site, comprising:
   probe means for picking up the desired analog signal in said machine tool circuit;
   an analog to digital converter coupled to the output of said probe means for converting said analog signal into a sequence of digital signals each of which represents the instantaneous amplitude of said analog signal at a corresponding time;
   means for applying the digital output of said analog to digital converter to a first memory which is associated with said machine control computer for storage;
   means for transmitting said sequence of digital signals stored in said first memory to said remote site;
   means at said remote site for receiving said transmitted sequence of digital signals;
   a second memory at said remote site;
   means for applying said received sequence of a digital signals to said second memory for storage;
   a digital to analog converter at said remote site;
   means for applying said sequence of digital signals stored in said second memory to said digital to analog converter for conversion into an approximation of said analog signal; and
   analog display means coupled to the output of said digital to analog converter for displaying said approximation of said analog signal.

2. The apparatus of claim 1 and also comprising a clock pulse circuit coupled to said analog to digital converter to control the operation thereof, said analog to digital converter being operable to perform an analog to digital conversion at the start of each clock period;
   means for entering each digital output number produced by said analog to digital conversion into said first memory before the next analog to digital conversion;
   means for counting the number of digital output numbers entered into said first memory; and
   means for terminating the entry of said digital output numbers into said first memory after a predetermined total number have been entered therein.

3. The apparatus of claim 2 wherein said means for counting the number of digital output numbers entered into said first memory and terminating the entry of said digital output numbers after a predetermined total has been reached comprises:
   a counter;
   means for presetting said counter to the desired total number of digital output numbers to be entered in said first memory;
   means for decrementing said counter each time a digital output word is entered in said first memory; and
   means for generating a termination signal when said counter returns to zero.

4. The apparatus of claim 2 and also comprising an address counter for said first memory;
   means coupling the output of said address counter to said first memory to determine the addresses of said digital output numbers entered therein;
   means for entering an initial address number in said address counter specifying the address of the first digital output number to be entered in said first memory; and
   means for incrementing said address counter every time a digital output number is entered into said first memory.

5. The apparatus of claim 1 wherein said first memory is a memory portion of said machine tool computer.

6. The apparatus of claim 5 and also comprising a diagnostic computer at said remote site, and wherein said second memory comprises a memory portion of said diagnostic computer.

7. The apparatus of claim 6 wherein said means for transmitting said sequence of digital numbers from said first memory to said second memory comprises a first modem at said machine tool site coupled to said machine tool computer and said first memory portion thereof;
   a second modem at said remote site coupled to said diagnostic computer and said second memory portion thereof; and
   a digital transmission link extending between said first and second modems to transmit said sequence of digital signals from said first memory to said second memory.

8. The apparatus of claim 7 wherein said digital transmission link includes a telephone line extending between said first and second modems.

9. Apparatus for displaying an analog signal which occurs in a computer controlled machine tool circuit on an analog display device which is located in a site remote from the machine tool site comprising:
   probe means for picking up the desired analog signal in said machine tool circuit;
   an analog to digital converter coupled to the output of said probe means for converting said analog signal into a sequence of digital signals each of which represents the instantaneous amplitude of said analog signal at a corresponding time;

means for transmitting said sequence of digital signals to said remote site;

means at said remote site for receiving said transmitted sequence of digital signals;

a digital to analog converter at said remote site for converting said sequence of digital signals into an approximation of said analog signal; and analog display means coupled to the output of said digital to analog converter for displaying said approximation of said analog signal.

10. The apparatus of claim 9 and also comprising a clock pulse circuit coupled to said analog to digital converter to control the operation thereof, said clock pulse circuit including an oscillator and a clock counter coupled to the output of said oscillator, the overflow signal of said counter comprising the output of said clock pulse circuit.

11. The apparatus of claim 10 and also comprising means for preloading a predetermined binary number into said clock counter every time it overflows to determine the length of its counting cycle to provide a clock period which is proportional to said predetermined binary number.

12. The apparatus of claim 9 wherein said analog display means has a vertical deflection input and a horizontal deflection input, the output of said digital to analog converter being coupled to said vertical deflection input.

13. The apparatus of claim 12 and further comprising a second digital to analog converter;

means for coupling a sequence of digital numbers which represent a horizontal sweep voltage to the input of said second digital to analog converter; and the output of said second digital to analog converter being coupled to said horizontal deflection input.

14. The apparatus of claim 13 wherein the digital inputs of both digital to analog converters are coupled in parallel to a common data bus.

15. The apparatus of claim 14 and also including a plurality of data latches coupled in series between the digital inputs to each digital to analog converter and said common data bus; and means for selectively clocking said data latches to enter the digital data on said common data bus into a selected one of said digital to analog converters while the data latches for the other digital to analog converter retain the data previously entered therein.

16. A method of displaying an analog signal which occurs in a computer controlled machine tool circuit on an analog display device which is located in a site remote from the machine site, comprising the steps of:

(A) selecting a clock period to be used in converting said analog signal into a sequence of digital signals each of which represents the instantaneous amplitude of said analog signal at a corresponding time;

(B) selecting the total number of digital signals to be included in said sequence of digital signals;

(C) converting the instantaneous amplitude of said analog signal to a corresponding digital number at the beginning of each successive clock period;

(D) counting the number of digital numbers generated in step (C);

(E) terminating the analog to digital conversion when the number of digital numbers generated in step (C) equals the total number selected in step (B);

(F) transmitting said sequence of digital signals to said remote site;

(G) converting said sequence of digital signals into an approximation of said analog signal at said remote site; and (H) applying said analog signal approximation to said analog display device to display said analog signal approximation thereon.

17. A method of displaying an analog signal which occurs in a computer controlled machine tool circuit on an analog display device which is located in a site remote from the machine tool site, comprising the steps of:

(A) selecting a clock period to be used in converting said analog signal into a sequence of digital signals each of which represents the instantaneous amplitude of said analog signal at a corresponding time;

(B) selecting the total number of digital signals to be included in said sequence of digital signals;

(C) converting the instantaneous amplitude of said analog signal to a corresponding digital number at the beginning of each successive clock period;

(D) counting the number of digital numbers generated in step (C);

(E) terminating the analog to digital conversion when the number of digital numbers generated in step (C) equals the total number selected in step (B);

(F) storing said sequence of digital signals in a first memory which is associated with said machine tool computer;

(G) reading said sequence of digital signals out of said first memory;

(H) transmitting said sequence of digital signals read out of said first memory to said remote site in which said analog display device is located;

(I) receiving said transmitted sequence of digital signals at said remote site;

(J) storing said received sequence of digital signals in a second memory located in said remote site;

(K) reading said sequence of digital signals out of said second memory;

(L) converting said sequence of digital signals read out of said second memory into an approximation of said analog signal; and (M) applying said analog signal approximation to said analog display device to display said analog signal approximation.

* * * * *